US006274060B1

(12) United States Patent
Sakashita et al.

(10) Patent No.: US 6,274,060 B1
(45) Date of Patent: Aug. 14, 2001

(54) WATER- AND OIL-REPELLENT

(75) Inventors: Hirotoshi Sakashita; Masamichi Morita; Motonobu Kubo, all of Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/497,879

(22) Filed: Feb. 4, 2000

(30) Foreign Application Priority Data

Feb. 4, 1999 (JP) .................................................. 11-027245

(51) Int. Cl.$^7$ ........................ C09K 3/18; D06M 15/327; D06M 15/33
(52) U.S. Cl. ............................ 252/8.62; 106/2; 252/8.61; 525/199; 525/200; 526/243; 526/244; 526/245; 526/246
(58) Field of Search .................................. 252/8.61, 8.62; 106/2; 525/199, 200; 526/243, 244, 245, 246

(56) References Cited

U.S. PATENT DOCUMENTS

| 4,695,488 | 9/1987 | Hisamoto et al. ................. 427/385.5 |
| 5,143,991 | 9/1992 | Amimoto et al. ..................... 526/245 |

FOREIGN PATENT DOCUMENTS

| 53-134786 | 11/1978 | (JP) . |
| 59-204980 | 11/1984 | (JP) . |
| 3-103411 | 4/1991 | (JP) . |
| 4-68006 | 3/1992 | (JP) . |
| 6-116340 | 4/1994 | (JP) . |
| 62-007782 | 1/1997 | (JP) . |

*Primary Examiner*—Anthony Green
(74) *Attorney, Agent, or Firm*—Birch, Stewart, Kolasch & Birch, LLP

(57) ABSTRACT

A water- and oil-repellent containing a copolymer of (a) a fluoroalkyl group-containing monomer having a melting point of 60 to 80° C. in the state of a homopolymer, and (b) a hydrophilic group-containing monomer is extremely superior in soil releasability.

12 Claims, No Drawings

WATER- AND OIL-REPELLENT

BACKGROUND OF THE INVENTION

The present invention relates to a water- and oil-repellent comprising a copolymer as well as textiles treated therewith.

A copolymer of (meth)acrylate (referred to hereinafter as "$R_f$ group-containing monomer") containing a fluoroalkyl group (abbreviated hereinafter into "$R_f$ group") and a hydrophilic group-containing monomer is known as a soil release agent (also referred to as "SR agent") which confers water- and oil-repellency on fiber, fabric etc. and makes soil adhering to fibers easily removable by washing (cf. JP-A-53-134786, JP-A-59-204980, and JP-A-62-7782). However, soil releasability (SR property) and the durability of water repellency were not so good.

Recently, soil release agents with improvements in soil releasability and the durability of water repellency were developed (cf. JP-A-3-103411, JP-A-4-68006, and JP-A-6-116340). However, a considerable amount of polymers should be used to achieve satisfactory soil releasability.

Accordingly, the development of a water- and oil-repellent showing high soil releasability and durability even at low concentration had been desired.

SUMMARY OF THE INVENTION

An object of the present invention is to provide a water- and oil-repellent which can be used as a soil release agent having better soil releasability than the conventional soil release agent.

The present invention provides a water- and oil-repellent comprising, as a major component (active ingredient), a copolymer comprising:
(a) a fluoroalkyl group-containing monomer having a melting point of 60 to 80° C. in the state of a homopolymer, and
(b) a hydrophilic group-containing monomer.

DETAILED DESCRIPTION OF THE INVENTION

The reason why the water- and oil-repellent comprising a copolymer of a $R_f$ group-containing monomer and a hydrophilic group-containing monomer exhibits higher soil releasability than that of a fluorine-containing water- and oil-repellent not containing the hydrophilic group-containing monomer is speculated by Sherman as follows [P. Sherman, S. Smith, B. Johannessen, Textile Research Journal, 39, 449 (1969)]. Since the $R_f$ group-containing compound has very low surface free energy, a fabric treated therewith exhibits high water- and oil-repellency in the air. On the other hand, the $R_f$ group-containing compound hardly exhibits oil-repellency in water. Hence, once oily soil adheres to the fabric, the oily soil is hardly removed by washing.

However, a copolymer comprising the $R_f$ group-containing monomer and the hydrophilic group-containing monomer can exhibit oil repellency even in water, thus facilitating the removal of oily soil by washing. The reason therefor is supposed to be that the $R_f$ group in the air emerges on the surface to make adhesion of soil difficult, and the hydrophilic group in water (during washing) emerges on the surface to render the surface hydrophilic, thus facilitating the removal of oily soil. The property that the molecular structure on the surface is altered depending on the environment, that is, in the air or in water, is called "flip-flop property" by Sherman et al.

The present inventors investigated the mechanism of exhibition of water- and oil-repellency and soil releasability in detail. As a result, the inventors proved surface-chemically that the flip-flop property is actually exhibited due to surface characteristics in air and in water, and polymers where the flip-flop property easily occurs are superior in soil releasability. A water- and oil-repellent superior in soil releasability to the conventional soil release agent can be realized by lowering the crystallinity of $R_f$ group in a polymer thin film to increase the motility of the polymer. On the other hand, if the crystallinity of $R_f$ group is too low, the oil repellency of the polymer in the air is lost, thus permitting oily soil to penetrate through a polymer thin film into the inside of fibers, and such oily soil is hardly removable by washing. That is, the crystallinity of $R_f$ group, which gives both good flip-fop property and good oil repellency in the air, is necessary.

The present invention improves further the soil release performance of the conventional soil release agent.

The melting point of a homopolymer arises from the crystallinity of $R_f$ group and can be measured by differential scanning calorimetry (DSC). The presence of crystals of $R_f$ group can be also confirmed by observing a peak derived from the self-aggregation thereof by wide-angle X-ray diffraction. Usually, crystallinity is expressed in terms of the degree of crystallization shown in the following equation:

[Degree of crystallization (%)]=$I_{Rf}/(I_{Rf}+I_{am})\times 100$ wherein $I_{Rf}$ is the intensity of a peak of $R_f$ group appearing at $2\theta=18°$, and $I_{am}$ is the intensity of a peak of an amorphous region.

The monomer used in the present invention is explained hereinafter.

The monomer (a) is preferably a compound represented by the general formula:

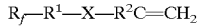

wherein $R_f$ is a $C_3$ to $C_{20}$ straight-chain fluoroalkyl group; $R^1$ is a $C_1$ to $C_{10}$ straight-chain or branched alkylene group; $R^2$ is a hydrogen atom or a methyl group; and X is —O—C(=O)— or —SO$_2$—N(A$^1$)—A$^2$— in which A$^1$ is a $C_1$ to $C_4$ alkyl group and A$^2$ is a direct bond or —A$^3$—O—C(=O)— in which A$^3$ is a $C_1$ to $C_4$ alkylene group. The melting point of a homopolymer comprising the monomer (a) is 60 to 80° C., for example 65 to 75° C.

The degree of crystallization of the homopolymer comprising the monomer (a) is preferably 50 to 85%, e.g. 60 to 80%.

The monomer (a) may be a mixture of at least 2 monomers.

A mixture of $R_f$ group-containing monomers which are different from one another in the chain length of $R_f$ group has been practically used as a soil release agent. For example, a mixture of fluoroalkyl(meth)acrylates containing $C_8$, $C_{10}$ and $C_{12}$ in the $R_f$ groups (weight ratio of 5:3:1) has been used. This is because fluoroalkyl intermediates, which are produced industrially by telomerization between tetrafluoroethylene and CF$_3$CF$_2$I, are obtained as a mixture of perfluoroalkyl iodide telomers which are different from one another in the number of carbons.

The present inventors discovered that those polymers having a lower proportion of monomers having a longer chain of $R_f$ group (specifically the number of carbons in $R_f$ group is 10 or 12) among monomers having such a distribution in the chain length of $R_f$ group exhibit higher polymer motility, thus leading to superior soil releasability. For example, the present inventors discovered that use of fluoroalkyl acrylate having $C_8$ $R_f$ group, which is obtained through purification from fluoroalkyl acrylates (those having $C_8$, $C_{10}$ and $C_{12}$ $R_f$ groups respectively in a weight ratio of 5:3:1) obtained by telomerization, provides a polymer with higher flip-flop property and thus with higher soil releasability than by use of the monomer mixture.

Specific examples of the $R_f$ group-containing monomer (a) are as follows:

$CF_3(CF_2)_7(CH_2)_2OCOCH=CH_2$;
a mixture of $CF_3(CF_2)_5(CH_2)_2OCOCH=CH_2$ and
$\quad CF_3(CF_2)_7(CH_2)_2OCOCH=CH_2$ in a weight ratio of 2:8;
a mixture of $CF_3(CF_2)_7(CH_2)_2OCOCH=CH_2$ and
$\quad CF_3(CF_2)_9(CH_2)_2OCOCH=CH_2$ in a weight ratio of 8:2;
a mixture of $CF_3(CF_2)_7(CH_2)_2OCOCH=CH_2$ and
$\quad CF_3(CF_2)_{11}(CH_2)_2OCOCH=CH_2$ in a weight ratio of 9:1;
$CF_3(CF_2)_7SO_2N(CH_3)(CH_2)_2OCOCH=CH_2$;
$CF_3(CF_2)_7SO_2N(C_2H_5)(CH_2)_2OCOCH=CH_2$;
$CF_3(CF_2)_7(CH_2)_2SO_2N(CH_2CH_3)CH=CH_2$;
a mixture of $CF_3(CF_2)_7(CH_2)_2SO_2N(CH_2CH_3)CH=CH_2$ and
$\quad CF_3(CF_2)_9(CH_2)_2SO_2N(CH_2CH_3)CH=CH_2$ in a weight ratio of 8:2;
a mixture of $CF_3(CF_2)_7(CH_2)_2SO_2N(CH_2CH_3)CH=CH_2$ and
$\quad CF_3(CF_2)_{11}(CH_2)_2SO_2N(CH_2CH_3)CH=CH_2$ in a weight ratio of 9:1; and
$CF)_3(CF_2)_7(CH_2)_2SO_2N(CH_3)CH=CH_2$.

As the $R_f$ group-containing monomer (a), the monomer wherein the number of carbons in the $R_f$ group is 8 is preferably used alone.

A mixture of the monomer wherein the number of carbons in the $R_f$ group is 8 and the monomer wherein the number of carbons in the $R_f$ group is other than 8 (for example, the number of carbons is from 3 to 7 or from 9 to 20) in a weight ratio of 100:0.5 to 50 may be used as the $R_f$ group-containing monomer.

The hydrophilic group-containing monomer (b) may have a carbon—carbon double bond and a hydrophilic group. Examples of the hydrophilic group include an ether group such as an alkylene ether, a hydroxyl group, a carboxyl group, a carbonyl group, a sulfo group, a sulfonamide group and a phospho group. The hydrophilic group-containing monomer (b) may be a (meth)acrylate ester having the hydrophilic group.

The hydrophilic group-containing monomer (b) is preferably a compound represented by the formula:

$$CH_2=CR^3COO-(R^4O)_n-R^5$$

wherein $R^3$ and $R^5$ represent a hydrogen atom or a methyl group; $R^4$ represents a $C_2$ to $C_6$ alkylene group; and n is an integer of 1 to 50, preferably 3 to 50.

Usually, $R^4$ is preferably $-CH_2-CH_2-$, but may be $-CH(CH_3)CH_2-$, $-CH(C_2H_5)CH_2-$ etc. That is, polyethylene glycol acrylate or methacrylate wherein $R^4$ is $-CH_2CH_2-$ can be used particularly preferably. The monomer (b) may be in the form of a mixture of monomers which are different in the type of $R^4$ or in the numerical value of n.

Specific examples of the hydrophilic group-containing monomer (b) include:
$CH_2=C(CH_3)COOCH_2CH_2OH$;
$CH_2=C(CH_3)COO(CH_2CH_2O)_9H$;
$CH_2=CHCOO(CH_2CH(CH_3)O)_{11}CH_3$;
$CH_2=CHCOO(CH_2CH_2O)_9H$;
$CH_2=C(CH_3)COO(CH_2CH_2O)_5(CH_2CH(CH_3)O)_3H$; and
$CH_2=C(CH_3)COO(CH_2CH_2O)_{40}H$.

The content of the $R_f$ group-containing monomer (a) may be at least 25% by weight, preferably 30 to 80% by weight, particularly 40 to 70% by weight, based on the copolymer. With the content of less than 25% by weight, the copolymer might give unsatisfactory water- and oil-repellency.

The proportion of the hydrophilic group-containing monomer (b) may be at least 10% by weight, preferably 20 to 70% by weight, particularly 30 to 60% by weight, based on the copolymer. With a content of less than 10% by weight, the soil releasability of the copolymer might not be satisfactory.

The molecular weight of the copolymer of the present invention may be 1,000 to 500,000, preferably 5,000 to 200,000. A molecular weight of less than 1,000 might lead to inadequate durability, while a molecular weight of more than 500,000 might cause very high viscosity in a treatment solution, thus lowering workability. The molecular weight is a value obtained by a gel permeation chromatography in terms of polystyrene standards. The copolymer of the present invention may be a random, block or graft copolymer.

The copolymer of the present invention may contain not only the $R_f$ group-containing monomer (a) and the hydrophilic group-containing monomer (b) but also $R_f$ group-free monomers such as ethylene, vinyl chloride, vinylidene halide, styrene, acrylic acid and alkyl esters thereof, methacrylic acid and alkyl esters thereof, benzyl methacrylate, vinyl alkyl ketone, vinyl alkyl ether, isoprene, chloroprene, maleic anhydride, butadiene, 3-chloro-2-hydroxypropyl (meth)acrylate, glycerol mono(meth)acrylate and glycidyl (meth)acrylate. The $R_f$ group-free monomers can be copolymerized to form a copolymer which is advantageous in water and oil repellency, durability, flexibility, solubility, resistance to water pressure, and costs. Further, the molecular weight of the copolymer can be regulated by a chain transfer agent so that other various properties can be suitably improved. The proportion of these $R_f$ group-free, polymerizable compounds is 0 to 40% by weight, preferably 0 to 20% by weight, based on the copolymer.

In order to obtain the copolymer of the present invention, various polymerization systems such as bulk polymerization, solution polymerization, emulsification polymerization and radiation polymerization can be selected. For example, it is possible to adopt a method wherein polymerizable compounds as the starting materials are dissolved in a suitable organic solvent and then subjected solution polymerization by the action of a polymerization initiator (a peracid or an azo compound soluble in the organic solvent used or an ionizing radiation). Specifically, various compounds, for example, peracids, azo-type or persulfuric acid-type compounds can be used as the polymerization initiator in the reaction system. It is also possible to adopt a method wherein a mixture of compounds to be copolymerized is emulsified in water in the presence of a surface active agent and copolymerized under stirring.

The copolymer obtained in this manner can be prepared in an arbitrary form such as a solution in solvent, an emulsion or an aerosol to give a water- and oil-repellent.

The water- and oil-repellent of the present invention can contain a medium such as water and organic solvent, and a surface active agent (e.g. an anionic surface active agent, a cationic surface active agent and/or a nonionic surface active agent) in addition to the copolymer.

Examples of the organic solvent include ketones such as acetone, methyl ethyl ketone and methyl isobutyl ketone, esters such as ethyl acetate, propyl acetate and butyl acetates, alcohols such as ethanol, isopropanol, butanol, 1,3-butane diol and 1,5-pentane diol, halogenated hydrocarbons such as perchloroethylene, trichlene, 1,1 -dichloro-2,2,3,3,3-pentafluoropropane, 1,3-dichloro-1,2,2,3,3-pentafluoropropane and 1,1-dichloro-1-fluoroethane (HCFC-141b), hydrocarbons such as octane, petroleum, toluene and xylene, as well as dipropylene glycol, dipropylene glycol monomethyl ether, tripropylene glycol monomethyl ether, polypropylene glycol, triethylene glycol dimethyl ether, propylene glycol, and ethylene glycol.

Examples of the anionic surface active agent include sodium lauryl sulfate, triethanolamine lauryl sulfate, sodium polyoxyethylene lauryl ether sulfate, sodium polyoxyethylene nonyl phenyl ether sulfate, triethanolamine polyoxyethylene lauryl ether sulfate, cocoyl sarcosine sodium, sodium N-cocoyl methyl taurine, sodium polyoxyethylene(coconut) alkyl ether sulfate, sodium diether hexyl sulfosuccinate, sodium α-olefinsulfonate, sodium lauryl phosphate, sodium polyoxyethylene lauryl ether phosphate, and perfluoroalkyl carboxylates (Unidine DS-101 and 102 manufactured by Daikin Industries, Ltd.).

Examples of the cationic surface active agent include dialkyl($C_{12}$–$C_{22}$) dimethyl ammonium chloride, alkyl (coconut)dimethyl benzyl ammonium chloride, octadecylamine acetate salt, tetradecylamine acetate salt, tallow alkyl propylene diamine acetate salt, octadecyl trimethyl ammonium chloride, alkyl(tallow)trimethyl ammonium chloride, dodecyl trimethyl ammonium chloride, alkyl(coconut) trimethyl ammonium chloride, hexadecyl trimethyl ammonium chloride, biphenyl trimethyl ammonium chloride, alkyl(tallow)imidazoline quaternary salt, tetradecyl methyl benzyl ammonium chloride, octadecyl dimethyl benzyl ammonium chloride, dioleyl dimethyl ammonium chloride, polyoxyethylene dodecyl monomethyl ammonium chloride, polyoxyethylene alkyl ($C_{12}$–$C_{22}$) benzyl ammonium chloride, polyoxyethylene lauryl monomethyl ammonium chloride, 1-hydroxyethyl-2-alkyl(tallow)imidazoline quaternary salt, a silicone-based cationic surface active agent containing a siloxane group as a hydrophobic group, a fluorine-containing cationic surface active agent containing a fluoroalkyl group as a hydrophobic group (Unidine DS-202 manufactured by Daikin Industries, Ltd.).

Examples of the nonionic surface active agent include polyoxyethylene lauryl ether, polyoxyethylene tridecyl ether, polyoxyethylene cetyl ether, polyoxyethylene polyoxypropylene cetyl ether, polyoxyethylene stearyl ether, polyoxyethylene oleyl ether, polyoxyethylene nonyl phenyl ether, polyoxyethylene octyl phenyl ether, polyoxyethylene monolaurate, polyoxyethylene monostearate, polyoxyethylene monoleate, sorbitan monolaurate, sorbitan monostearate, sorbitan monopalmitate, sorbitan monostearate, sorbitan monoleate, sorbitan sesquioleate, sorbitan trioleate, polyoxyethylene sorbitan monolaurate, polyoxyethylene sorbitan monopalminate, polyoxyethylene sorbitan monostearate, polyoxysorbitan monoleate, polyoxyethylene polyoxypropylene block polymer, polyglycerin fatty acid esters, polyether-modified silicone oil (SH3746, SH3748, SH3749 and SH3771 manufactured by Toray Dow Corning Silicone), perfluoroalkyl ethylene oxide adducts (Unidine DS-401 and DS-403 manufactured by Daikin Industries, Ltd.), fluoroalkyl ethylene oxide adducts (Unidine DS-406 manufactured by Daikin Industries, Ltd.) and a perfluoroalkyl oligomer (Unidine DS-451 manufactured by Daikin Industries, Ltd.).

The proportion of the copolymer may be at least 60% by weight, preferably 1 to 30% by weight, based on the water- and oil-repellent.

The water- and oil-repellent of the present invention can be applied in any arbitrary method as a soil release agent to a substrate to be treated, depending on the type of the treated substrate and the form of preparation described above (solution in solvent, aerosol etc.). For example, in the case of the solution in solvent and the aqueous emulsion, a method of adhering the agent to the surface of a substrate to be treated and then drying it can be adopted according to conventional coating techniques, such as immersion coating. If necessary, the curing may be conducted by applying the water- and oil-repellent along with a suitable cross-linking agent. Further, an aerosol-type soil release agent may be applied by simply spraying it onto a substrate to be treated, and after immediately dried, satisfactory water and oil repellency can be exhibited.

Further, other polymer blender may be mixed with the copolymer of the present invention to give a soil release agent. As a matter of course, the soil release agent can be obtained by using other water- and oil-repellents, mothproofing agents, flame retardants, antistatic agents, dye stabilizers and crease-preventing agents as additives.

Substrates subjected to soil release treatment are usually textiles. Various examples can be mentioned as the textiles. For example, animal and vegetable natural fibers such as cotton, hemp, wool and silk, synthetic fibers such as polyamide, polyester, polyvinyl alcohol, polyacrylonitrile, polyvinyl chloride and polypropylene, semi-synthetic fibers such as rayon and acetate, inorganic fibers such as glass fibers, carbon fibers and asbestos fibers or mixture fibers thereof.

The textiles may be in any form of fiber, yarn, fabric etc. For the treatment, the copolymer of the present invention can be used after diluted to a concentration of 0.1 to 30% by weight, preferably 1 to 10% by weight. If the concentration is too low, it is impossible to give good performances. If the concentration is too high, the feeling of the treated fibers is worsened.

PREFERRED EMBODIMENTS OF THE INVENTION

Hereinafter, the present invention is described in more detail by reference to the Examples, Comparative Examples and Test Example.

However, as a matter of course, their description is not intended to limit the present invention.

Soil releasability (SR) test was conducted as follows: A test cloth was spread over a horizontally placed absorbent paper, and 0.05 ml of 0.1% carbon black dispersed in triolein was dropped as soil on the cloth. A polyethylene sheet was placed thereon, a 500 g weight was placed thereon, and 60 seconds later, the weight and the polyethylene sheet were removed, and the test cloth was left at room temperature for 24 hours so that the soil was allowed to adhere to the test cloth. Then, the weight of the test cloth was made 500 g by adding ballast cloths, and the test cloth was washed with 12.5 g of detergent (Super Compact Top manufactured by Lion Corporation) for 5 minutes in an electric washing machine having a bath volume of 25 L at a bath temperature of 40° C., then rinsed, and dried at room temperature. The brightness of the portion of the soil remaining in the dried test cloth was measured by a color difference meter (CR-200 manufactured by Minolta) and the soil releasability was evaluated according to the degree of staining (%) described below.

The soil releasability was evaluated in terms of "degree of staining" using the brightness of remaining colored solid particles (that is, carbon black) as an indicator, as shown in the following equation:

[Degree of staining (%)]=$(R_0-R)/R_0 \times 100$ wherein $R_0$ is the brightness of the non-stained cloth, and R is the brightness of the stained cloth. In this measurement, it is assumed that upon washing, solid stain particles are washed off along with the oily stain (that is, triolein), and the removal degree of composite staining consisting of the solid particles and thus the oil can be evaluated by measuring the brightness of only the solid stain particles which can be visually judged. The present inventors have confirmed that there is a correlation between carbon black and triolein in respect of the degree of removal. Accordingly, the evaluation of soil releasability in terms of the degree of staining described above is an easy and practical method by which the solid stain particles and the oily stain can be simultaneously measured. A lower degree of staining indicates higher soil releasability.

REFERENCE PREPARATIVE EXAMPLE 1

10 g of a $CF_3CF_2(CF_2CF_2)_nCH_2CH_2OCOCH=CH_2$ (n=3) monomer (abbreviated into "17FA") and 40 g of 1,1,2,3,4,4-hexafluorotetrachlorobutane were introduced into a four-necked flask, and the oxygen in the system was sufficiently replaced by nitrogen, then 0.5 g of t-butylperoxy pivalate (Perbutyl PV manufactured by Nippon Oil and Fats Co., Ltd.) was added thereto, and the reaction was conducted at 60° C. for 6 hours under stirring. The resulting polymer was precipitated again with ethanol and purified to give 9 g of white fine powder polymer.

REFERENCE PREPARATIVE EXAMPLES 2 TO 4

Homopolymers were prepared from a monomer which is a mixture of the $CF_3CF_2(CF_2CF_2)_nCH_2CH_2OCOCH=CH_2$ compounds wherein n is 3, 4 and 5 in a weight ratio of 5:3:1 (abbreviated into "T-FA") (Reference Preparative Example 2), from a compound of the above formula wherein n is 2 (abbreviated into "13FA") (Reference Preparative Example 3) and from a compound of the above formula wherein n is 4 (abbreviated into "21FA") (Reference Preparative Example 4) respectively in the same manner as in Reference Preparative Example 1.

PREPARATIVE EXAMPLE 1

24 g of 17FA prepared in Reference Preparative Example 1, 16 g of $CH_2=C(CH_3)COOCH_2CH_2OH$ (abbreviated into "HEMA") and 360 g of isopropanol were introduced into a four-necked flask, the oxygen in the system was sufficiently replaced by nitrogen, then 0.1 g of 2,2-azobis(2-methylbutyronitrile) [V-59 manufactured by Wako Pure Chemical Industries, Ltd.] was added thereto, and the copolymerization reaction was initiated at 60° C. 30 minutes later, the temperature in the system was raised to 70° C. 0.01 g of the initiator was added at 30 minutes and 1 hour later, respectively. The mixture was reacted for 6 hours after the initiator was first added. The resulting polymer was precipitated again with n-hexane and purified to give 36 g of white fine powder polymer.

COMPARATIVE PREPARATIVE EXAMPLES 1 TO 3

A copolymer of T-FA and HEMA (Comparative Preparative Example 1), a copolymer of 13FA and HEMA (Comparative Preparative Example 2) and a copolymer of 21FA and HEMA (Comparative Preparative Example 3) were prepared respectively in the same manner as in Preparative Example 1.

EXAMPLE 1

The polymers prepared in Reference Preparative Examples 1 to 4 were measured for their melting points by a DSC measurement and for the degrees of crystallization by X-ray diffraction, and the results are shown in Table 1. The DSC measurement was conducted using 10 mg of sample at a temperature rise rate of 20° C./min. in DSC-50 manufactured by Shimadzu Corporation. The X-ray diffraction was conducted with an output of 40 kV and 50 mA using CuKα (15.42 nm) as an X-ray source in Rotor Flex RAD-rA model manufactured by Rigaku Denki K.K. The degree of crystallization was calculated from the following equation:

[Degree of crystallization (%)]=$I_{Rf}/(I_{Rf}+I_{am}) \times 100$ wherein $I_{Rf}$ is peak intensity of $R_f$ group appearing at $2\theta=18°$, and $I_{am}$ is peak intensity of an amorphous region.

TABLE 1

|  | Type of polymer | Melting point (° C.) | Degree of crystallization (%) |
|---|---|---|---|
| Reference Preparative Example 1 | 17FA homopolymer | 73 | 72 |
| Reference Preparative Example 2 | T-FA homopolymer | 88 | 88 |
| Reference Preparative Example 3 | 13FA homopolymer | none | 0 |
| Reference Preparative Example 4 | 21FA homopolymer | 130 | 90 |

The melting points and the degrees of crystallization of the homopolymers comprising the $R_f$ group-containing monomer were lowered as the chain length of $R_f$ group is decreased. Accordingly, it is considered that as the number of carbons in the $R_f$ group is decreased, the molecular motility of the polymer is high. The melting point of 13FA homopolymer wherein the number of carbons in the $R_f$ group is 6 was not observed. This is because the homopolymer is not crystallized owing to the short chain length of the $R_f$ group and the considerably high molecular motility of the polymer.

EXAMPLE 2

The polymers prepared in Preparative Example 1 and Comparative Preparative Examples 1 to 3 were examined for the temperatures (softening points) at which their appearance became round under a microscope by heating on a hot plate as well as for the degrees of crystallization by X-ray diffraction in the same manner as in Example 1. The results are shown in Table 2.

TABLE 2

|  | Type of polymer | Softening point (° C.) | Degree of crystallization (%) |
|---|---|---|---|
| Preparative Example 1 | 17FA/HEMA | 120 | 10 |
| Comparative Preparative Example 1 | T-FA/HEMA | 132 | 27 |

TABLE 2-continued

| | Type of polymer | Softening point (° C.) | Degree of crystallization (%) |
|---|---|---|---|
| Comparative Preparative Example 2 | 13FA/HEMA | 116 | 0 |
| Comparative Preparative Example 3 | 21FA/HEMA | 135 | 67 |

It is considered that as the chain length of the $R_f$ group is decreased, the softening point and the degree of crystallization of the copolymer are lowered, and the molecular motility is raised. As shown in Example 1, this probably arises from the fact that as the chain length of the $R_f$ group is decreased, the molecular motility of the homopolymer is increased.

EXAMPLE 3

The polymers prepared in Preparative Example 1 and Comparative Preparative Examples 1 to 3 were diluted with a mixture solvent of toluene and isopropanol to a polymer content of 1 weight-%, and a film of polyethylene terephthalate was immersed at 0.5 mm/sec. in each polymer solution. After air-dried, each film was heat-treated at 80° C. for 3 minutes. Then, the contact angle of each film to water in the air and the contact angle of each film to air bubble in water (after immersion for 5 minutes) were measured in a contact angle measuring instrument manufactured by Kyowa Kaimen Kagaku K.K. The contact angle to air bubble in water was measured in an original cell. The results are shown in Table 3.

TABLE 3

| | Type of polymer | Contact angle (°) of film to water in the air | Contact angle (°) of film to air bubble in water |
|---|---|---|---|
| Preparative Example 1 | 17FA/HEMA | 110 | 43 |
| Comparative Preparative Example 1 | T-FA/HEMA | 109 | 52 |
| Comparative Preparative Example 2 | 13FA/HEMA | 107 | 45 |
| Comparative Preparative Example 3 | 21FA/HEMA | 110 | 57 |

Any of the copolymers exhibited a contact angle of about 110° to water in the air, showing high water repellency. However, the contact angle to air bubble in water was about 50°, which was considerably lower than that (about 100°) of the 17FA/stearyl acrylate copolymer which is a copolymer of hydrophobic monomers. This indicates that these copolymers are hydrophobic in the air while hydrophilic in water, and that the surface structure of these copolymers is changed (flip-flop property) when transferred from the air to water. Comparison of the respective structures of the polymers indicates that the contact angle to air bubble in water was lower in the case of the 13FA copolymer and 17FA copolymer having a short chain length of $R_f$ group. This is probably because as the chain length of the $R_f$ group becomes shorter, the molecular motility is made higher to permit the flip-flop property to occur easily.

EXAMPLE 4

The same film as treated with the polymers in Example 3 was used to measure ESCA in a dried state and a hydrated state. ESCA750 manufactured by Shimadzu Corporation was used. The emission angle was 20°. The film in a dried state after heat treatment was measured as such. In order to measure the film in a hydrated state, the film was immersed in water for 5 minutes, then excess water was removed, and immediately the hydrated film was measured. The ratio (F/C) of the area of a peak derived from fluorine to the area of a peak derived from carbon, as well as the ratio (O/C) of the area of a peak derived from oxygen to the area of a peak derived from carbon, were examined. The results are shown in Table 4.

TABLE 4

| | | F/C | | O/C | |
|---|---|---|---|---|---|
| | Type of polymer | Dried state | Hydrated state | Dried state | Hydrated state |
| Preparative Example 1 | 17FA/HEMA | 1.33 | 1.08 | 0.21 | 0.26 |
| Comparative Preparative Example 1 | T-FA/HEMA | 1.33 | 1.18 | 0.22 | 0.25 |
| Comparative Preparative Example 2 | 13FA/HEMA | 1.17 | 0.98 | 0.27 | 0.33 |
| Comparative Preparative Example 3 | 21FA/HEMA | 1.40 | 1.23 | 0.20 | 0.23 |

When changed from the dried state to the hydrated state, any of the copolymers had decreased F/C and slightly increased O/C. This indicates the decrease of $R_f$ group and the increase of hydrophilic groups on the surface of the polymer and that the surface structure thereof was changed by immersion in water. The comparison of the respective structures of the polymers indicates that the decrease of F/C and the increase of O/C from the dried state to the hydrated state were more significant in the case of the 13FA copolymer and 17FA copolymer having a short chain length of the $R_f$ group. This is because the molecular motility is higher as the chain length of the $R_f$ group is shorter, thus permitting the flip-flop property to occur easily, as also shown in Example 3.

EXAMPLE 5

The polymers prepared in Preparative Example 1 and Comparative Preparative Examples 1 to 3 were diluted with a mixture solvent of toluene and isopropanol to a polymer content of 0.5 weight-%. A cotton broad cloth was immersed therein and squeezed with rolls such that its wet pick-up was 50%. After air-dried, the cloth was heat-treated at 80° C. for 3 minutes. The cloth thus treated was examined in the soil releasability test. The results are shown in Table 5.

TABLE 5

| | Type of polymer | Degree of staining (%) |
|---|---|---|
| Preparative Example 1 | 17FA/HEMA | 4.5 |
| Comparative Preparative Example 1 | T-FA/HEMA | 21.8 |

TABLE 5-continued

| | Type of polymer | Degree of staining (%) |
|---|---|---|
| Comparative Preparative Example 2 | 13FA/HEMA | 10.0 |
| Comparative Preparative Example 3 | 21FA/HEMA | 21.4 |
| — | not treated | 30.2 |

The 17FA copolymer comprising T-FA as a major component wherein the chain length of the $R_f$ group is short and constant (number of carbon atoms: 8) exhibited a lower degree of staining and higher soil releasability than those of the T-FA copolymer having a distribution in the chain length of the $R_f$ group (mixture of $C_8$, $C_{10}$ and $C_{12}$) practically used as the starting material of the soil release agent, and those of the 21FA copolymer wherein the chain length of the $R_f$ group is long (number of carbon atoms: 10). It was considered that the 17FA copolymer has higher molecular motility, thus easily exhibiting the flip-flop property. On the other hand, the 13FA copolymer considered to have the highest molecular motility was poor in soil releasability to the 17FA copolymer.

EXAMPLE 6

Eight types of oils (hydrocarbons) with different surface tensions were dropped on the cloth treated in Example 5 and the oil repellency of the cloth was examined. The results are shown in Table 6. The surface tensions of the dropped oils (25° C.) were point 1—31.2, point 2—29.6, point 3—27.3, point 4—26.7, point 5—25.0, point 6—23.5, point 7—21.8 and point 8—20.0 mN/m, respectively, and the highest point of the oil not penetrating into the cloth was taken as oil repellency. A higher point of oil repellency indicates a lower surface free energy of the treated cloth.

TABLE 6

| | Type of polymer | Oil repellency |
|---|---|---|
| Preparative Example 1 | 17FA/HEMA | 8 |
| Comparative Preparative Example 1 | T-FA/HEMA | 8 |
| Comparative Preparative Example 2 | 13FA/HEMA | 0 |
| Comparative Preparative Example 3 | 21FA/HEMA | 8 |

The 17FA copolymer, the T-FA copolymer and the 21FA copolymer exhibited high oil repellency, while the 13FA copolymer was poor in oil repellency to permit penetration of any oils. Accordingly, the reason why the 13FA copolymer considered to have the highest molecular mobility is inferior in soil releasability to the 17FA copolymer is possibly that its crystallinity is poor due to its very short $R_f$ group and dissappeared oil repellency so that oily stain penetrating deeply into fibers is hardly washed away.

EXAMPLE 7

The cloth treated in Example 5 was washed five times in the same manner as in the soil releasability test and then examined in the soil releasability test. The results are shown in Table 7.

TABLE 7

| | Type of polymer | Degree of staining (%) |
|---|---|---|
| Preparative Example 1 | 17FA/HEMA | 5.5 |
| Comparative Preparative Example 1 | T-FA/HEMA | 27.2 |
| Comparative Preparative Example 2 | 13FA/HEMA | 15.0 |
| Comparative Preparative Example 3 | 21FA/HEMA | 26.5 |
| — | not treated | 30.6 |

As in the results in Example 5, the degree of staining of the cloth treated with the 17FA copolymer was lower than with the T-FA copolymer or the 21FA copolymer. This indicates that even after repeated washing, the 17FA copolymer exhibits high soil releasability and is excellent in durability.

EFFECT OF THE INVENTION

The water- and oil-repellant agent comprising the copolymer of the present invention is extremely superior in soil releasability to the conventional water- and oil-repellents.

What is claimed is:

1. A water- and oil-repellent comprising a copolymer comprising:

(a) a fluoroalkyl group-containing monomer having a melting point of 60 to 80° C. in the state of a homopolymer, wherein the fluoroalkyl group-containing monomer (a) is a compound represented by the general formula:

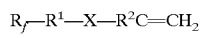

$R_f-R^1-X-R^2C=CH_2$ wherein $R_f$ is a $C_3$ to $C_{20}$ straight-chain fluoroalkyl group, $R^1$ is a $C_1$ to $C_{10}$ straight-chain or branched alkylene group, $R^2$ is a hydrogen atom or a methyl group, and X is —O—C(=O)— or $SO_2$—N($A^1$)—$A^2$— in which $A^1$ is a $C_1$ to $C_4$ alkyl group and $A^2$ is a direct bond or —$A^3$—O—C(=O)— in which $A^3$ is a $C_1$ to $C_4$ alkylene group; and (b) a hydrophilic group-containing monomer, wherein the hydrophilic group-containing monomer (b) is a compound represented by the general formula:

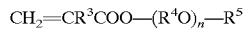

$CH_2=CR^3COO-(R^4O)_n-R^5$ wherein $R^3$ and $R^5$ represent a hydrogen atom or a methyl group; $R^4$ represents a $C_2$ to $C_6$ alkylene group; and n is an integer of 1 to 50; and wherein when the fluoroalkyl group-containing monomer (a) is $CF_3CF_2(CF_2CF_2)_3CH_2CH_2OCOCH=CH_2$, the hydrophilic group-containing monomer (b) is not $CH_2=C(CH_3)COO(CH_2CH_2O)_9CH_3$.

2. The water- and oil-repellent according to claim 1, wherein the number of carbon atoms in the fluoroalkyl group in the fluoroalkyl group-containing monomer (a) is 8.

3. The water-space and oil-repellent according to claim 1, wherein the fluoroalkyl group-containing monomer (a) has a degree of crystallization in the state of a homopolymer of 50 to 85%.

4. The water- and oil-repellent according to claim 1, wherein the fluoroalkyl group-containing monomer (a) has a melting point of 65 to 75° C. in the state of a homopolymer.

5. The water- and oil-repellent according to claim 1, wherein the fluoroalkyl group-containing monomer (a) has a degree of crystallization of 60 to 80%.

6. The water- and oil-repellent according to claim 1, wherein the content of the fluoroalkyl group-containing monomer (a) is at least 25% by weight, and the content of the hydrophilic group-containing monomer (b) is at least 10% by weight.

7. The water- and oil-repellent according to claim 1, wherein the content of the fluoroalkyl group-containing monomer (a) is at least 40 to 70% by weight, and the content of the hydrophilic group-containing monomer (b) is at least 30 to 60% by weight.

8. The water- and oil-repellent according to claim 1, wherein the molecular weight of the copolymer is in the range of 5,000 to 200,000.

9. The water- and oil-repellent according to claim 1, wherein the fluoroalkyl group-containing monomer (a) is selected from the group consisting of $CF_3(CF_2)_7(CH_2)_2OCOCH=CH_2$;

a mixture of $CF_3(CF_2)_5(CH_2)_2OCOCH=CH_2$ and $CF_3(CF_2)_7(CH_2)_2OCOCH=CH_2$ in a weight ratio of 2:8;

a mixture of $CF_3(CF_2)_7(CH_2)_2OCOCH=CH_2$ and $CF_3(CF_2)_9(CH_2)_2OCOCH=CH_2$ in a weight ratio of 8:2;

a mixture of $CF_3(CF_2)_7(CH_2)_2OCOCH=CH_2$ and $CF_3(CF_2)_{11}(CH_2)_2OCOCH=CH_2$ in a weight ratio of 9:1;

$CF_3(CF_2)_7SO_2N(CH_3)(CH_2)_2OCOCH=CH_2$;

$CF_3(CF_2)_7SO_2N(C_2H_5)(CH_2)_2OCOCH=CH_2$;

$CF_3(CF_2)_7(CH_2)_2SO_2N(CH_2CH_3)CH=CH_2$;

a mixture of $CF_3(CF_2)_7(CH_2)_2SO_2N(CH_2CH_3)CH=CH_2$ and $CF_3(CF_2)_9(CH_2)_2SO_2N(CH_2CH_3)CH=CH_2$ in a weight ratio of 8:2;

a mixture of $CF_3(CF_2)_7(CH_2)_2SO_2N(CH_2CH_3)CH=CH_2$ and $CF_3(CF_2)_{11}(CH_2)_2SO_2N(CH_2CH_3)CH=CH_2$ in a weight ratio of 9:1; and $CF_3(CF_2)_7(CH_2)_2SO_2N(CH_3)CH=CH_2$.

10. The water- and oil-repellent according to claim 1, wherein the hydrophilic group-containing monomer (b) is selected from the group consisting of $CH_2=C(CH_3)COOCH_2CH_2OH$;

$CH_2=C(CH_3)COO(CH_2CH_2O)_9H$;

$CH_2=CHCOO(CH_2CH(CH_3)O)_{11}CH_3$;

$CH_2=CHCOO(CH_2CH_2O)_9H$;

$CH_2=C(CH_3)COO(CH_2CH_2O)_5(CH_2CH(CH_3)O)_3H$; and $CH_2=C(CH_3)COO(CH_2CH_2O)_{40}H$.

11. The water- and oil-repellent according to claim 9, wherein the hydrophilic group-containing monomer (b) is selected from the group consisting of $CH_2=C(CH_3)COOCH_2CH_2OH$;

$CH_2=C(CH_3)COO(CH_2CH_2O)_9H$;

$CH_2=CHCOO(CH_2CH(CH_3)O)_{11}CH_3$;

$CH_2=CHCOO(CH_2CH_2O)_9H$;

$CH_2=C(CH_3)COO(CH_2CH_2O)_5(CH_2CH(CH_3)O)_3H$; and $CH_2=C(CH_3)COO(CH_2CH_2O)_{40}H$.

12. Textiles treated with the water- and oil-repellent according to claim 1.

* * * * *